United States Patent [19]

Sugawara et al.

[11] 4,340,577

[45] Jul. 20, 1982

[54] PROCESS FOR PRODUCING CARBON BLACK

[75] Inventors: Kohichi Sugawara; Isamu Matsui; Naoki Ishimaru, all of Ohmuta; Teruhiro Ikegami, Taimeimachi, all of Japan

[73] Assignee: Denki Kagaku Kogyo Kabushiki Kaisha, Tokyo, Japan

[21] Appl. No.: 212,433

[22] Filed: Dec. 3, 1980

[30] Foreign Application Priority Data

Mar. 11, 1980 [JP] Japan .................................. 55-30777

[51] Int. Cl.$^3$ ......................... C01B 31/02; C09C 1/48
[52] U.S. Cl. ................................... 423/450; 423/449; 423/458
[58] Field of Search ................ 423/450, 458, 449, 445

[56] References Cited

U.S. PATENT DOCUMENTS 3,371,997  3/1968  Jordon et al. ...................... 23/209.4

FOREIGN PATENT DOCUMENTS 547516   4/1974  Japan .
53-162029 7/1978 Japan .
670863   4/1952  United Kingdom .
1119656  7/1968  United Kingdom .
1473516  5/1977  United Kingdom .

OTHER PUBLICATIONS

Bureau of Mines Report 4695, 1950.

*Primary Examiner*—O. R. Vertiz
*Assistant Examiner*—Gregory A. Heller
*Attorney, Agent, or Firm*—Oblon, Fisher, Spivak, McClelland & Maier

[57] ABSTRACT

Carbon black is produced from sources of acetylene and at least one gaseous hydrocarbon selected from the group consisting of ethylenically unsaturated hydrocarbons, aromatic unsaturated hydrocarbons, monocyclic unsaturated hydrocarbons and polycyclic unsaturated hydrocarbons and oxygen. A thermal decomposition of acetylene and a partial combustion-reaction of hydrocarbon independently perform at a moment at the initiation of the reaction; and then, performing mixed reactions of all sources for the reactions in the same region in a reaction furnace.

5 Claims, 2 Drawing Figures

PROCESS FOR PRODUCING CARBON BLACK

BACKGROUND OF THE INVENTION

1. Field of the Invention

The present invention relates to a process for producing carbon black and an apparatus for producing the same. More particularly, it relates to a process for producing carbon black of a developed structure, and excellent electric conductivity and thermal conductivity which is produced from acetylene and an unsaturated hydrocarbon as sources and an apparatus for producing the same.

2. Description of the Prior Art

Usually, carbon black produced by the thermal decomposition of acetylene has a developed structure and has excellent characteristics such as electric conductivity, thermal conductivity and liquid adsorption and accordingly, the carbon black has been used for applications requiring such characteristics as electroconductive resins and rubbers and dry batteries etc.

It is especially important for the dry battery to have excellent liquid adsorption. The liquid of the commercially available acetylene type carbon black measured by the hydrochloric acid adsorption defined in Japanese Industrial Standard K 1469 is in a range of about 15.6 to 16.0 ml./5 g. In view of the requirement of the improved characteristics of a dry battery, a hydrochloric acid adsorption of greater than 17.0 ml./5 g. is required.

Various processes for producing such carbon black have been proposed. In Japanese Examined Patent Publication No. 30414/1968, improvement in liquid adsorption is achieved by using a furnace black produced by feeding additional acetylene to a carbon black produced after substantially most of a given amount of hydrocarbon for the carbon black product has been burned, and decomposing the acetylene. The product has, however, the same or lower liquid adsorption in comparison to conventional acetylene black. Although the amount of expensive acetylene is reduced, the improvement does not contribute to any improvement of the characteristics.

SUMMARY OF THE INVENTION

It is an object of the present invention to provide a process for producing carbon black having excellent electric conductivity, thermal conductivity and the desired developed structure for high liquid adsorption from economic hydrocarbon sources.

The foregoing and other objects of the present invention have been attained by providing a process for producing carbon black from sources of acetylene and at least one gaseous hydrocarbon selected from the group consisting of ethylenically unsaturated hydrocarbons, aromatic unsaturated hydrocarbons, monocyclic unsaturated hydrocarbons and polycyclic unsaturated hydrocarbons and oxygen, which comprises performing independently a thermal decomposition of acetylene and a partial combustion-reaction of hydrocarbon at the moment of initiation of the reaction; and then, performing the mixed reactions of all sources for the reactions in the same region in a reaction furnace.

BRIEF DESCRIPTION OF THE DRAWINGS

Figures show one embodiment of the present invention.

DETAILED DESCRIPTION OF THE PREFERRED EMBODIMENTS

Figure 1:
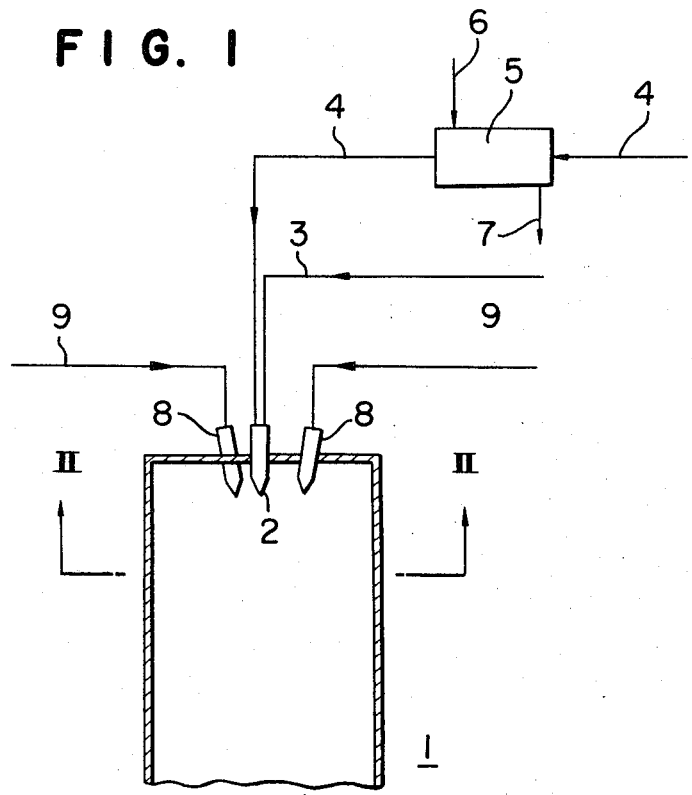
FIG. 1 is a schematic view of the apparatus used for the process of the present invention.

The present invention overcomes the disadvantages of conventional carbon black formation processes. Usually, the unsaturated hydrocarbon used for carbon black having a developed structure and oxygen for the partial combustion and acetylene are fed at specific ratios into the reaction furnace to perform the main reaction for producing carbon black in the same region. In the feeding of the sources, the nozzles which feed oxygen and the specific unsaturated hydrocarbon are separate from the nozzle for feeding acetylene to achieve the independent partial combustion of the unsaturated hydrocarbon and the thermal decomposition of acetylene for a moment at the initiation of the reactions.

The process of the present invention will be illustrated in detail.

The process of the present invention comprises a step of producing carbon black by the partial combustion of a gaseous hydrocarbon and oxygen and the step of producing carbon black by the thermal decomposition of acetylene. The steps are not clearly discriminated. Both steps are considered to be independent steps at the initial period of the reaction, however most of the reactions in the later step occur in the common region. There is a possibility that a portion of the acetylene reacts with oxygen.

Therefore, in accordance of the process of the present invention, the feed of oxygen and the hydrocarbon and the feed of acetylene should be performed from adjacent nozzles having desired gaps so that the partial combustion of the hydrocarbon and the thermal decomposition of acetylene are independently performed at the initial period of the reaction and the main steps of the reactions are performed in a uniform system.

Preferably the time period in which the partial combustion of the hydrocarbon and the thermal decomposition of acetylene occur independently is less than 0.1 second as the average resident time. That is, in accordance with the process of the present invention, the two steps are independently performed at the initial stage of the reaction. However, the later step is performed in the common region to produce carbon black having uniform characteristics.

The hydrocarbons used in the process of the present invention should be in gaseous form. When a liquid hydrocarbon is used, the particle diameter distribution of carbon black is substantially broadened to an inferior uniformity.

The hydrocarbons used in the present invention are usually used for producing carbon blacks having a highly developed structure and can be ethylenically unsaturated hydrocarbons; aromatic unsaturated hydrocarbons; monocyclic unsaturated hydrocarbons; and polycyclic unsaturated, polycyclic unsaturated hydrocarbons. The kinds of the hydrocarbon are not limited and can be any hydrocarbons for desired uses if they can be used in a gaseous form whereby the physical characteristics of the conventional acetylene black can be maintained to produce a carbon black having excellent high liquid adsorption properties under the mutual and complicated effects of the partial combustion of the hydrocarbon with oxygen and the thermal decomposition of acetylene.

The desired ratios of the hydrocarbon, oxygen and acetylene in the process of the present invention will be illustrated.

The ratio of oxygen required for the partial combustion of the hydrocarbons is preferably controlled to produce carbon black at a ratio of 50 to 80 wt. % based on the carbon component in the hydrocarbon. The amount of oxygen is too small to produce carbon black by the partial combustion of the hydrocarbon; however, the thermal decomposition is performed in the common region to provide much heat energy thereby reaching to the desired reaction temperature. If a large amount of oxygen is fed into the system to produce carbon black at a ratio of less than 50 wt. % based on the carbon component of the fed hydrocarbon, the temperature of the combustion flame is too high resulting in deterioration in the development of the structure of the resulting carbon black whereby the desired liquid adsorption properties can not be obtained. On the other hand, if a small amount of oxygen is fed into the system to produce carbon black at a ratio of more than 80 wt. % based on the carbon component of the fed hydrocarbon, the combustion of the hydrocarbon is not enough and the temperature in the reaction furnace is too low whereby a carbon black having the desired liquid adsorption can not be obtained.

The amount of acetylene employed preferably is that amount needed to produce carbon black at a ratio of 40 to 90 wt. % of the carbon component derived from acetylene to the total carbon black. If the carbon component derived from acetylene is more than 90 wt. %, it provides only the carbon black having the same liquid adsorption as that of the carbon black produced by only the thermal decomposition of acetylene, whereas if the carbon component derived from acetylene is less than 50 wt. %, a carbon black having a satisfactory liquid adsorption can not be obtained.

In accordance with the process of the present invention, the temperature in the regions where the carbon black is produced by the partial combustion of a hydrocarbon and the thermal decomposition of acetylene and where both reactions occur together ranges from 1600° to 2300° C.

Downstream from these said regions, it is preferable to place an ageing region for the crystalline modification of the carbon black produced in said regions by a thermal effect whereby other characteristics besides liquid adsorption, such as electric conductivity and the applicability of the carbon black for dry batteries can be improved. In particularly, the average residence time of the product in the reaction furnace is controlled to be about several seconds to 10 seconds. The average residence time is in order of about 10 to 100 times to that of the production of the carbon black by the conventional furnace black method. However, the combustion of the hydrocarbon is performed with oxygen and the ratio of oxygen is small so that the capacity of the reaction furnace per unit amount of the resulting carbon black is relatively small and the reactions are easily performed. Since acetylene is additionally used and the ratio of oxygen is small, the yield of the carbon black is high and a long residence time can be used. If the residence time is long in the conventional furnace black method, the yield of product is substantially reduced.

Referring to Figures, one embodiment of the apparatus of the present invention will be illustrated.

Figure 2:
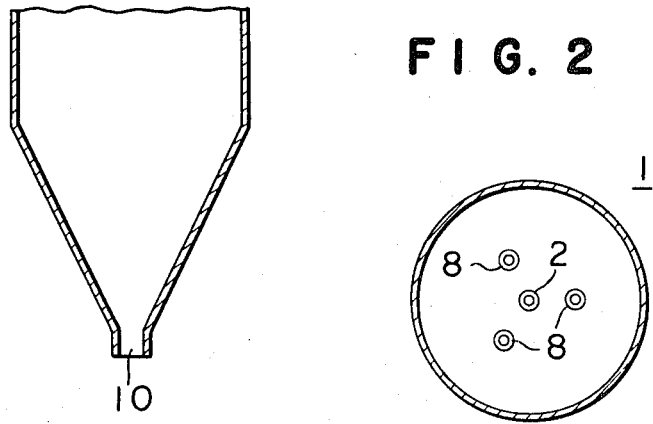
FIG. 2 is a sectional view taken along the II—II line of FIG. 1.

FIG. 1 is a schematic view of a central sectional view of a reactor furnace and feed lines; and FIG. 2 is a sectional view taken along the II—II line of FIG. 1. Reference number (1) designates a vertical reaction furnace which is equipped with a hydrocarbon feed nozzle (2) for feeding a gaseous hydrocarbon and oxygen at the central upper part; (3) designates an oxygen feed pipe; (4) designates a hydrocarbon feed pipe. When the hydrocarbons used are in a liquid form, the hydrocarbon is vaporized by heating with steam fed from a steamer (5) through a steam feed pipe (6) and the vaporized hydrocarbon is fed into the hydrocarbon feed nozzle (2). Reference number (7) designates an outlet pipe; (8) designates an acetylene feed nozzle for feeding acetylene; and (9) designates an acetylene feed pipe.

The acetylene feed nozzle (8) and the hydrocarbon nozzle (2) should be placed at the central upper part of the vertical reaction furnace so as to thoroughly mix acetylene with the hydrocarbons to produce carbon black under homogeneous conditions. Therefore as shown in the Figures, the hydrocarbon nozzle (2) is placed as the main feed nozzle at the center of the furnace and three acetylene feed nozzles (8) are placed as sub-feed nozzles surrounding the main feed nozzle. It is possible to reverse this structure so that the acetylene nozzle (2) is placed as the main feed nozzle and hydrocarbon feed nozzle (8) can be placed as the sub-feed nozzle around the main nozzle. The number of the sub-feed nozzles is not limited to 3 but can be 2 or 4 or more depending upon the feed ratio of the raw materials and the designation of the furnace. As described above, the main feed nozzle can be either the acetylene feed nozzle or the hydrocarbon feed nozzle. It is preferable to select the nozzle depending upon the lower feed rate of the starting material which is either the hydrocarbon or oxygen, in view of the controls of flow rates.

The distance between the hydrocarbon feed nozzle and the acetylene feed nozzle depends upon the diameter of the reaction furnace and can not be precisely defined in terms of specific millimeters. Thus, they should be separated from each other so as to result in independent reactions for a moment and should be substantially positioned away from the wall of the reaction furnace. If the distance between the acetylene feed nozzle and the hydrocarbon feed nozzle is too short for example, less than 50 mm, the growth structure of the carbon black is reduced to give lower liquid adsorption.

If the distance between the wall of the furnace and the nozzles placed near the wall is too short, carbon grit is produced on the inner wall of the reaction furnace which easily causes problems such as clogging of the nozzles.

A part of the hydrocarbon fed into the reaction furnace is burned and the remainder is thermally decomposed to produce carbon black. Most of the acetylene is thermally decomposed to produce carbon black and hydrogen. In the reaction furnace, the thermal decomposition of acetylene and the partial combustion-reactions of the hydrocarbon are separately performed just after the hydrocarbon reactants are fed through the acetylene feed nozzle and the hydrocarbon feed nozzle. Such a period is quite short and only small amounts of carbon black are produced by the separate reactions and most of the carbon black is produced in the same region in the mixed condition.

The resulting carbon black is entrained in a gas flow comprising mainly hydrogen gas and carbon monoxide gas and is discharged through outlet (10) of the reaction furnace and is separated and collected by the conventional process.

In accordance with the present invention, carbon black having a substantially developed structure is obtained. The characteristics of the iodine adsorption exponent and electric resistivity can be easily controlled without adversely affecting the structural characteristics. A carbon black product having a constant quality can be produced for a long time depending upon the changes in the conditions in the reaction furnace. Thus, the yield of carbon black based on carbon in the sources of acetylene and hydrocarbons is remarkably high at about 70 to 95%.

The present invention will be illustrated by certain examples and references which are provided for purposes of illustration only and are not intended to be limiting the invention.

EXAMPLES 1 to 3

In a vertical reaction furnace having an inner diameter of 60 cm and a length of 3.6 m as shown in Figures, gaseous benzene and oxygen were fed through a main feed nozzle placed at the center of the top; and acetylene was fed through three sub-feed nozzles placed on a circle having a diameter of 18 cm around the center with each equal distance to incline the nozzles for about 4° to the central axial direction whereby carbon black was produced. The conditions are shown in Table 1 and the results are shown in Table 2.

REFERENCE 1

The same reaction furnace of Example 1 was used except that the main feed nozzle was closed. Acetylene, vaporized benzene and oxygen were mixed at the same ratios and the mixed gas was fed through the three sub-feed nozzles whereby carbon black was produced. The feed rate and the test results of the product are respectively shown in Table 1 and Table 2.

The Table 2, the hydrochloric acid adsorption and the electric resistivity were measured by Japanese Industrial Standard K 1469. The iodine adsorption exponent was measured by ASTM D 1510.

TABLE 1

|  | Example 1 | Example 2 | Example 3 | Reference 1 |
|---|---|---|---|---|
| Acetylene |  |  |  |  |
| feed rate (Nm³/hr.) | 40 | 35 | 35 | 40 |
| yield of carbon black (kg./hr.) | 42.3 | 37.0 | 37.0 | 42.3 |
| Benzene |  |  |  |  |
| feed rate (kg./hr.) | 25 | 40 | 55 | 25 |
| yield of carbon black (kg./hr.) | 13.7 | 25.0 | 34.9 | 13.7 |
| percent based on |  |  |  |  |

TABLE 1-continued

|  | Example 1 | Example 2 | Example 3 | Reference 1 |
|---|---|---|---|---|
| total carbon components | 59.6 | 67.9 | 68.7 | 59.6 |
| Ratio of carbon black (%) |  |  |  |  |
| $\frac{\text{acetylene C} \times 100}{\text{acetylene C} + \text{benzene C}}$ | 75.5 | 59.6 | 48.5 | 75.5 |
| Oxygen feed rate Nm³/hr. | 8.5 | 10.7 | 14.3 | 8.5 |

TABLE 2

|  | Example 1 | Example 2 | Example 3 | Reference 1 |
|---|---|---|---|---|
| HCl adsorption (ml/5 g.) | 17.4 | 17.6 | 17.5 | 14.8 |
| I₂ adsorption exponent (mg/g.) | 95.4 | 87.3 | 75.8 | 98.5 |
| Electric resistivity ($\Omega^{-cm}$) | 0.215 | 0.190 | 0.182 | 0.208 |

What is claimed as new and desired to be secured by Letters Patent of the United States is:

1. A process for producing carbon black, comprising: simultaneously ejecting streams of thermally decomposing acetylene and a partially burning hydrocarbon selected from the group consisting of ethylenically unsaturated hydrocarbons, aromatic hydrocarbons, monocyclic unsaturated hydrocarbons and polycyclic unsaturated hydrocarbons in the presence of oxygen from separate sources allowing initiation of the decomposing and combustion reactions before said streams converge, and immediately mixing the materials in the streams such that the bulk of the decomposition and combustion reactions occur while all of the materials are combined in a single zone in a reaction furnace, whereby said carbon black product is produced having the ability to adsorb hydrogen chloride in amounts greater than 17.0 ml/5 g of carbon black.

2. The process of claim 1, wherein the amount of oxygen mixed with said hydrocarbon for the partial combustion of the same is that amount which results in the conversion of 50 to 80 wt% of the hydrocarbon based on its carbon content to carbon black.

3. The process of claim 1, wherein the feed rate of acetylene is controlled such that the amount of carbon black formed from acetylene in the total carbon black product is 40 to 90 wt%.

4. The process of claim 1, wherein the period in which acetylene and said hydrocarbon are separately decomposed ranges from 1000 microsecond to 100,000 microseconds.

5. The process of claim 1, wherein all phases of the carbon black formation reactions occur at a temperature ranging from 1600° to 2300° C.

* * * * *